United States Patent
Lewin et al.

(10) Patent No.: US 10,424,867 B2
(45) Date of Patent: Sep. 24, 2019

(54) SUBSEA TERMINATION GLAND, CONNECTOR FRONT END AND CONNECTOR ASSEMBLY

(71) Applicant: Siemens Aktiengesellschaft, Munich (DE)

(72) Inventors: Richard Lewin, Ulverston (GB); Christopher Plant, Lancaster (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/072,533

(22) PCT Filed: Jan. 25, 2017

(86) PCT No.: PCT/EP2017/051558
§ 371 (c)(1),
(2) Date: Jul. 25, 2018

(87) PCT Pub. No.: WO2017/133950
PCT Pub. Date: Aug. 10, 2017

(65) Prior Publication Data
US 2019/0081435 A1  Mar. 14, 2019

(30) Foreign Application Priority Data

Feb. 2, 2016 (EP) .................... 16153846

(51) Int. Cl.
*H01R 4/60* (2006.01)
*H01R 13/523* (2006.01)
(Continued)

(52) U.S. Cl.
CPC ....... *H01R 13/523* (2013.01); *H01R 13/5208* (2013.01); *H02G 1/10* (2013.01); *H02G 15/06* (2013.01); *H02G 15/14* (2013.01)

(58) Field of Classification Search
CPC .... H01R 13/523; H01R 13/5208; H02G 1/10; H02G 15/06; H02G 15/14
(Continued)

(56) References Cited

U.S. PATENT DOCUMENTS 3,412,365 A    11/1968  Nelson
3,508,188 A *  4/1970  Buck .................... H01R 13/523
                                                         439/141
(Continued)

FOREIGN PATENT DOCUMENTS

EP  2811584 A1  12/2014
WO  2007096760 A1  8/2007
WO  2016094513 A1  6/2016

OTHER PUBLICATIONS

International Search Report dated Apr. 13, 2017,f or PCT/EP2017/051558.
(Continued)

*Primary Examiner* — Abdullah A Riyami
*Assistant Examiner* — Vladimir Imas
(74) *Attorney, Agent, or Firm* — Beusse Wolter Sanks & Maire

(57) ABSTRACT

A subsea termination gland for providing a termination and connection to an electrical conductor has a first connector interface which is dry-mateable and is configured to be mated with a complementary second connector interface of a connector front end. The termination gland further includes a termination assembly having a connection member which provides a first connection section of the first connector interface. The connection member is connectable to the electrical conductor. The first connection section is exposed to the ambient environment when determination
(Continued)

gland is not mated with the connector front end. A sealing section seals the termination gland to the connector front end.

16 Claims, 12 Drawing Sheets

(51) Int. Cl.
    *H02G 1/10* (2006.01)
    *H02G 15/14* (2006.01)
    *H01R 13/52* (2006.01)
    *H02G 15/06* (2006.01)

(58) Field of Classification Search
    USPC .......................................................... 439/201
    See application file for complete search history.

(56) References Cited

U.S. PATENT DOCUMENTS

| | | | | |
|---|---|---|---|---|
| 3,972,581 A * | 8/1976 | Oldham | ............... | H01R 13/523 439/201 |
| 4,039,242 A * | 8/1977 | Wilson | ................. | H01R 13/523 439/188 |
| 4,050,765 A * | 9/1977 | Duesterhoeft | ........ | H01R 13/523 439/204 |
| 4,174,875 A * | 11/1979 | Wilson | ................. | H01R 13/523 439/190 |
| 4,363,168 A * | 12/1982 | Bryer | ................... | H01R 13/523 166/341 |
| 4,425,017 A * | 1/1984 | Chan | ....................... | C08K 5/098 252/572 |
| 4,479,690 A * | 10/1984 | Inouye | ................... | H02G 15/14 439/190 |
| 5,558,532 A * | 9/1996 | Hopper | ................... | E21B 33/03 439/201 |
| 7,683,261 B2 * | 3/2010 | Kesler | .................... | H05K 5/069 174/50.57 |
| 8,899,841 B2 * | 12/2014 | Cairns | .................. | G02B 6/4428 385/53 |
| 9,116,323 B2 * | 8/2015 | Cairns | .................. | G02B 6/4441 |
| 9,659,684 B2 * | 5/2017 | Burrow | ................. | H02G 15/10 |
| 9,715,068 B2 * | 7/2017 | Cairns | ................. | H01R 13/5205 |
| 9,780,482 B2 * | 10/2017 | Lewin | ....................... | H02G 1/10 |
| 9,800,344 B2 * | 10/2017 | Bjoerklund | ............. | H04B 3/36 |
| 9,806,456 B2 * | 10/2017 | Lewin | ................. | H01R 13/523 |
| 2008/0003868 A1 * | 1/2008 | Cairns | ................. | H01R 13/523 439/552 |
| 2013/0183003 A1 * | 7/2013 | Cairns | ................. | G02B 6/4428 385/77 |
| 2013/0309896 A1 | 11/2013 | Spencer et al. | | |
| 2015/0090473 A1 * | 4/2015 | Burrow | ................. | H02G 15/10 174/105 R |
| 2016/0126641 A1 * | 5/2016 | Lewin | ..................... | H01R 4/20 439/86 |

OTHER PUBLICATIONS

EP Search Report dated Jul. 27, 2016, for EP patent application No. 16153846.7.

* cited by examiner

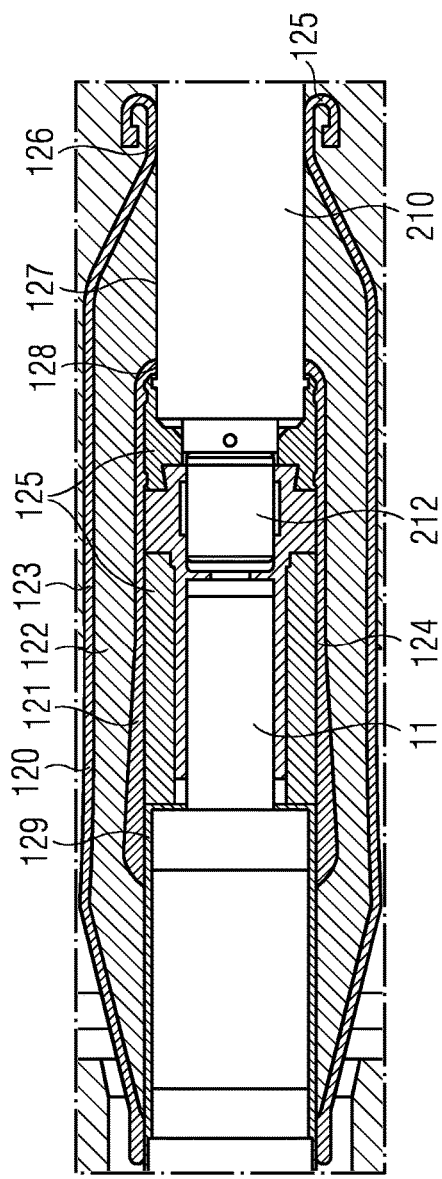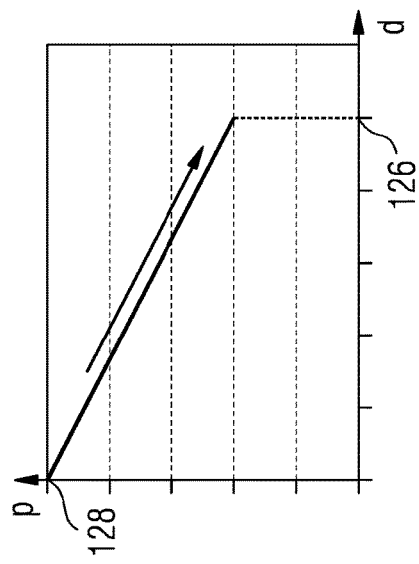

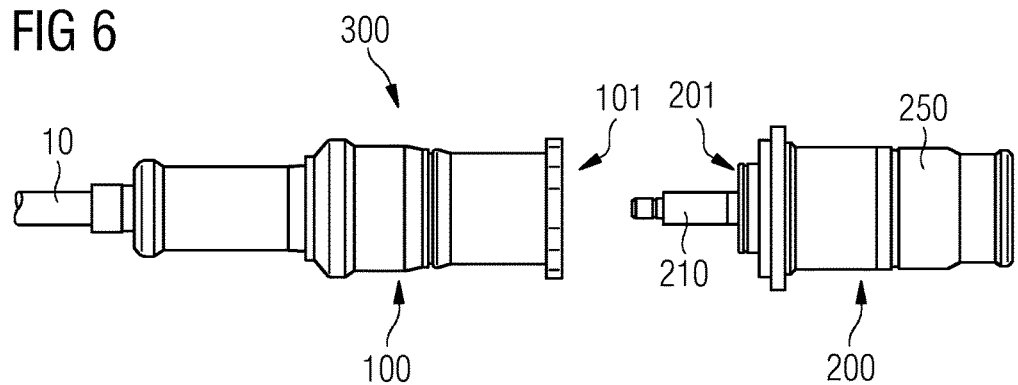
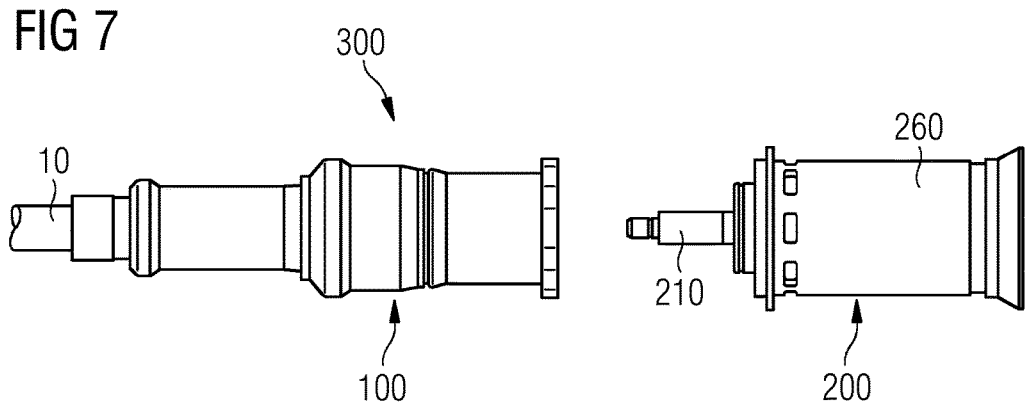
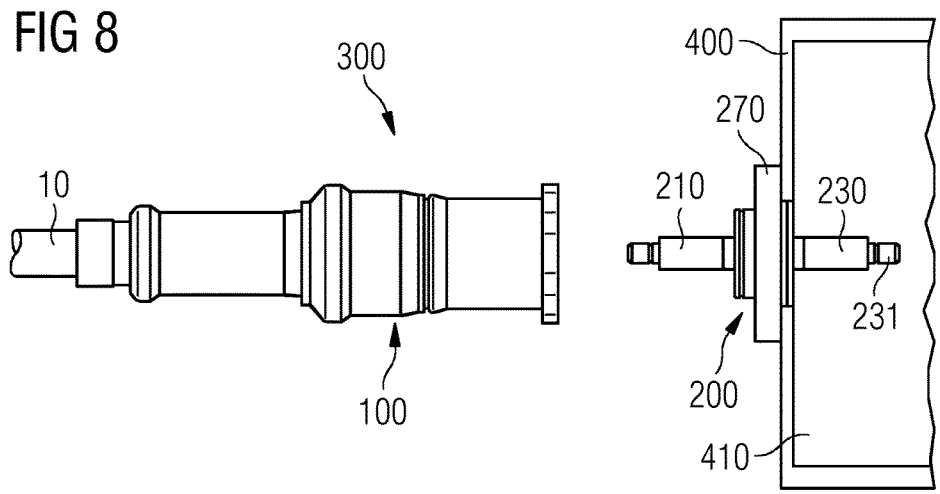

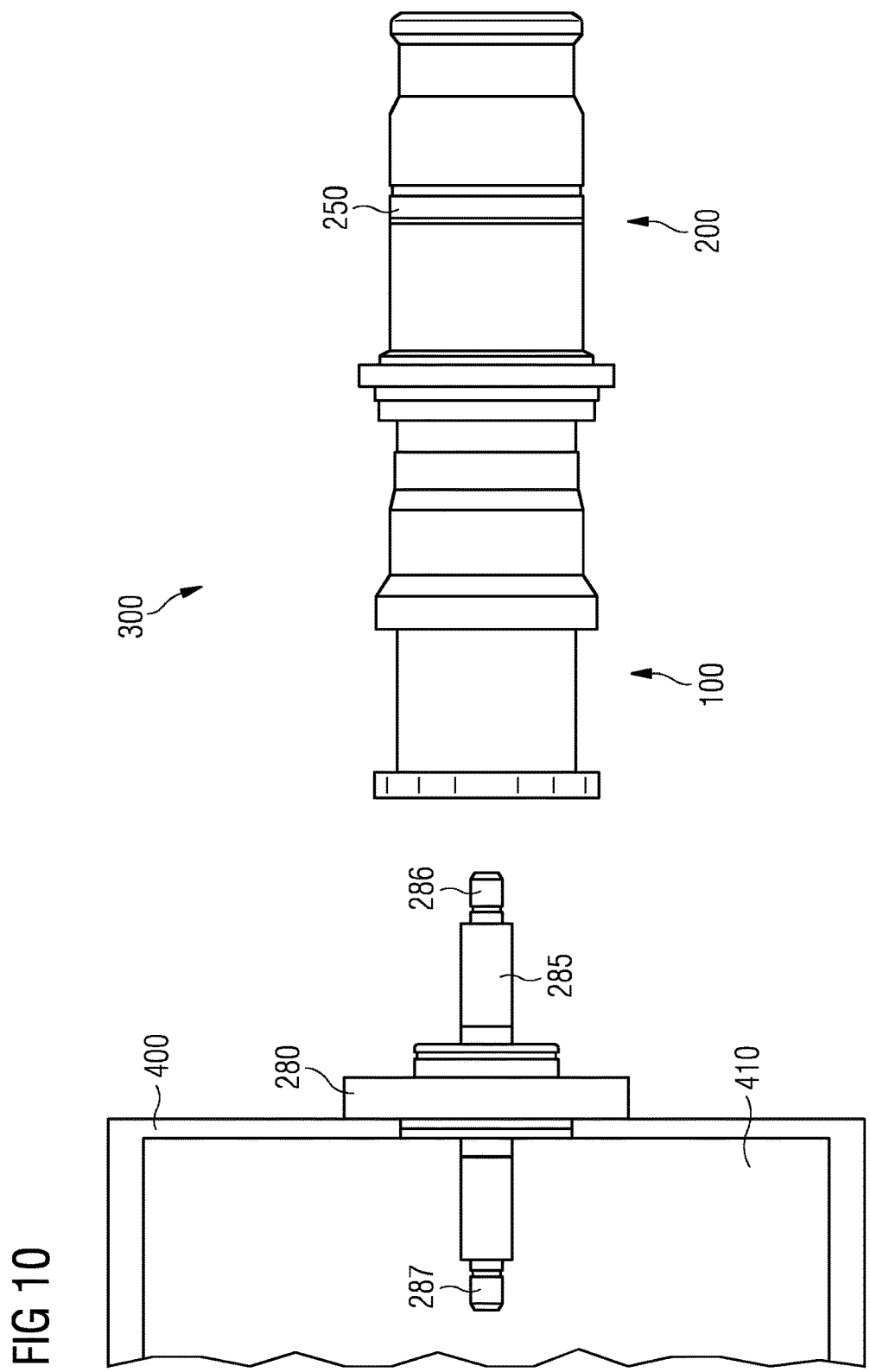

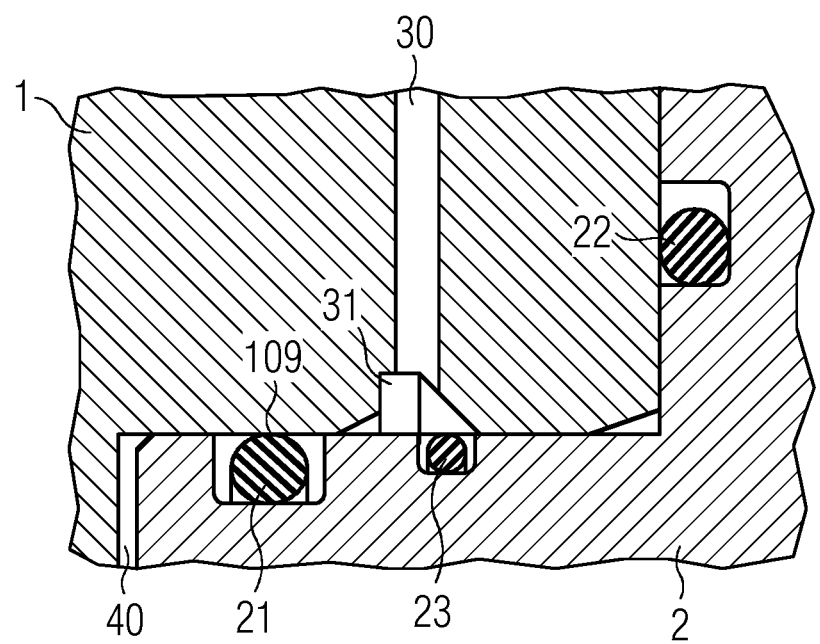

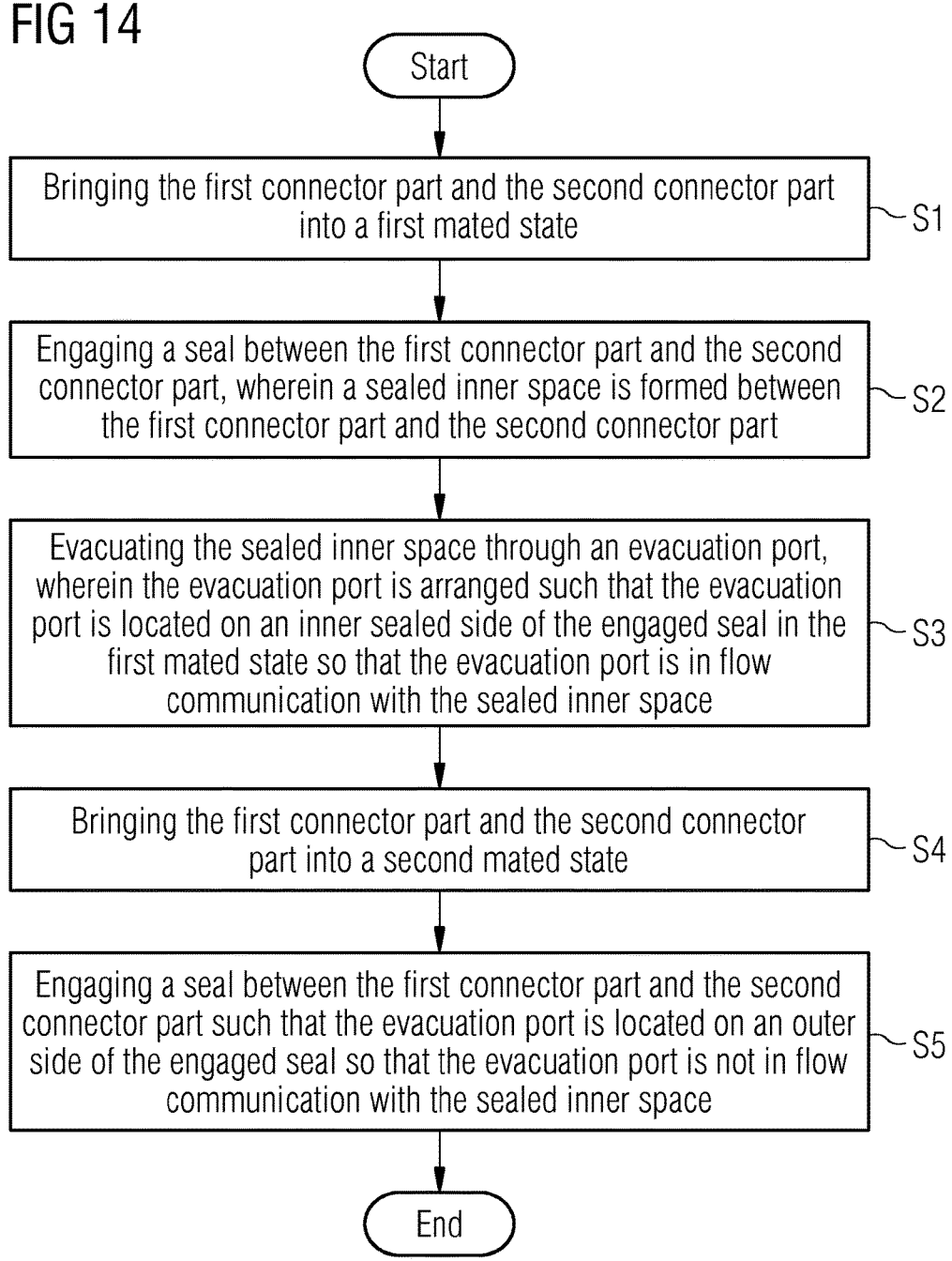

SUBSEA TERMINATION GLAND, CONNECTOR FRONT END AND CONNECTOR ASSEMBLY

CROSS REFERENCE TO RELATED APPLICATIONS

This application is the US National Stage of International Application No. PCT/EP2017/051558 filed Jan. 25, 2017, and claims the benefit thereof. The International Application claims the benefit of European Application No. EP16153846 filed Feb. 2, 2016. All of the applications are incorporated by reference herein in their entirety.

FIELD OF INVENTION

The present invention relates to a subsea termination gland for providing a termination and connection to an electrical conductor in an underwater environment, to a connector front end for underwater use and to a connector assembly for underwater use that comprises such termination gland and connector front end.

BACKGROUND OF INVENTION

Several applications are known in which connections need to be provided underwater, such as electrical connections or optical connections. Examples include a subsea installation for the production of hydrocarbons from a subsea well, in which different components of the subsea installation may need to be connected for power transfer and/or data communication. Such connections may for example comprise a connection from a topside installation, such as a floating or fixed platform, or from an onshore site to a subsea component, e.g. by means of an umbilical or a subsea cable. Other connections include electrical connections between different type of subsea equipment, such as a connection between a subsea transformer and subsea switchgear, a data connection between different control modules or between a hub and a satellite well. In some configurations, such connections need to transport significant amounts of electrical power. It is desirable to provide connectors that are capable of transporting electrical power at high voltages.

Subsea electrical connectors usually have two connector parts that can be mated, for example a plug part and a receptacle part, which may also be designated as a male part and a female part. At the forward end of the connector part, the connector part is mated with the respective other connector part. Wet-mateable connectors are capable of being mated in a subsea environment at several hundreds or even more than one thousand meters of water depth. On the other (rear) end of such connector, the connector must somehow be connected to an electrical conductor, such as the conductor of a subsea cable or to the conductor of a pin that is provided in the wall of a subsea enclosure. Such termination and connection is usually provided in a so called cable gland. The termination is critical for the establishing of a good electrical contact between for example such cable and the electrical contact of the connector, e.g. a connector pin. Furthermore, when the connector is operated at high voltages, for example an excess of ten thousand volts, the termination must be capable of withstanding such high voltage potential differences between the energized conductors and the system's earth.

A termination for a connector is for example described in the document EP 2 811 584 A1. In such connector, a gland is assembled onto the connector rear part, the connector comprising a pin. A crimp provides an electrical contact between the back of the connector pin and the conductor of the cable. Insulation between the high voltage elements and the connector earth may then for example be provided by a filling of the connector with dielectric fluid, which may for example be a polymer material that can be cured, for example an encapsulating rubber, it may also be a gel or an oil.

Such filling has to occur with high precision in a clean environment, since any pollution of the filling fluid may lead to problems with respect to the insulation. Any failures can result in a low insulation resistance, partial discharges, and at worst in an electrical breakdown of the insulators. It may thus take several attempts before a sufficient quality of the fluid fill is achieved. Furthermore, the fluid fill can take a relatively long time to perform, and additional time is required for curing. For example, this can amount to more than one day for a gel or for a setting elastomeric material. If the first fluid fill was not successful, additional long times are required to strip down the connector and to have a further attempt.

In particular, the termination between such pin and a cable by means of the cable gland often needs to occur onsite, for example on board a ship at sea or at the dockside. The reason is that the pin may for example be required to close and seal a relatively large subsea enclosure that cannot easily be transported to the manufacturing site of the subsea cable. Furthermore, such transportation would require a significant amount of time, and it may not have been decided on the configuration of cables and connectors which are to be used with the respective subsea device. Accordingly, in such onsite environments, the cleanliness and the quality of the fluid fill of the termination gland is difficult to control, and pollution and an insufficient quality of the fill can result. Furthermore, due to the required time for the fill, the filling of such connector requires resources and is cost intensive.

SUMMARY OF INVENTION

Accordingly, there is a need to improve the termination of such electrical conductor for providing a subsea electrical connection. In particular, it is desirable to improve the quality of such termination with respect to the electrical insulation and reliability, and to reduce the costs and time required to make such termination. Furthermore, it is desirable to facilitate an onsite termination of such electrical conductor.

Accordingly, there is a need to mitigate at least one of the problems outlined above and to provide an improved termination of electrical conductors for underwater use.

This need is met by the features of the independent claims. The dependent claims describe embodiments of the invention.

According to an embodiment of the present invention, a subsea termination gland for providing a termination and connection to an electrical conductor in an underwater environment is provided. The subsea termination gland comprises a dry-mateable first connector interface. The first connector interface is configured to be mated with a complementary second connector face of a connector front end, in particular in a dry environment. It further comprises a termination assembly comprising a connection member providing a first connection section of the first connector interface, the connection member comprising one or more pressure resistant components and a moulding comprising a flexible or resilient moulding; wherein the moulding forms a passage which is tapered, wherein an inner diameter of the passage is larger at a front portion in proximity to the pressure resistant components, the front portion configured to allow a pin of the connector front end to enter the passage and wherein the inner diameter is reduced towards the middle of the insulator. The connection member is connectable to the electrical conductor. The first connection section is exposed to the ambient environment when the termination gland is not mated with the connector front end. The termination gland furthermore comprises a sealing section for sealing the termination gland to the connector front end. The termination gland of the present invention is configured such that the first connection section is engaged or engageable with a second connection section of the second connector interface in a dry environment to provide a subsea connector part that is operable in an underwater environment.

By embodiments of the invention, the subsea connector part may thus efficiently be separated into a termination gland and a front end. Since these are dry-mateable by means of the first connector interface, a fast and secure engagement of the termination gland and the connector front end becomes possible. As an example, the connector front end may be mounted to a subsea enclosure and may seal the interior of the subsea enclosure so that the subsea enclosure can be transported to an assembly site or a deployment site. Onsite, a subsea cable to which the termination gland is mounted can then by means of the first connector interface be dry-mated to the second connector interface of the connector front end. A subsea cable may thus fast and efficiently be mounted and connected to such connector front end sealing a subsea enclosure. Furthermore, with such termination gland, different types of connector front ends may be used. Accordingly, when such termination gland is for example used to terminate the electrical conductor of a subsea cable, the end of the cable may be provided with different connector front ends, in particular with a wet-mateable front end, such as a connector plug or a connector receptacle front end. Since the termination can be established in a fast and reliable way by making use of the first and second dry-mateable connector interfaces, the decision on which front end to use can be made onsite, and a safe, fast and cost efficient onsite termination may be achieved.

In an embodiment, the connection member and the first connection section are configured such that the connector front end is de-mateable from the subsea termination gland. Accordingly, a fast and efficient exchange of the connector front end becomes possible in such configuration. In conventional systems, in which for example an elastomeric material was cured inside the cable gland and connector housing, a removal of the connector housing from the cable gland was difficult as well as time and cost intensive. By making use of the subsea termination gland with the first connector interface that is mateable with the second connector interface of the connector front end, such exchange may be greatly facilitated.

The first connector interface may have an opening for insertion of the pin of the second connector interface. The first connection section may be arranged in the opening. When the termination gland is not mated with the connector front end, the opening may be open to the ambient environment. A dry-mate configuration may thus be achieved in which the connector front end is mated in dry environment with the termination gland, so that no filling with a fill fluid, such as a dielectric liquid or gel, is required.

The termination gland may have a gland housing, and the electrical conductor may reach into the gland housing. The gland housing comprises an inner chamber that is filled with a medium, in particular an insulating medium, or a pressure and compensating medium, or a temperature compensating medium and sealed against the ambient environment, in particular the subsea environment. The opening (which forms part of the first connector interface) may be provided in a front portion of the gland housing and may be sealed from the inner chamber. By filling the gland housing with the medium, pressure compensation of the interior of the gland housing may be achieved, so that the termination gland can be deployed in substantial water depths, for example in excess of one thousand meters or even in excess of three thousand meters.

In particular, the inner chamber may be a pressure compensated chamber. The termination gland may comprise a pressure compensator that balances the pressure inside the inner chamber to the pressure prevailing in a surrounding environment, for example in surrounding seawater. The pressure compensator may for example be provided by a bellows, a membrane, or a combination thereof, or pressure compensation may occur via a subsea cable, such as an oil filled hose, to the end of which the termination gland is attached.

Sealing of the inner chamber may for example be achieved by means of a boot or moulding that is sealed to the gland housing and provides the opening, and that may also be sealed to for example a pin or a cable providing said electrical conductor, or to a sleeve mounted to such cable, pin, conductor or the like.

In an embodiment, the first connection section is a socket configured to receive the second connection section having the form of an end of a pin. In another embodiment, the first connection section of the connection member has a cylindrical section that is configured to be received in the second connection section which has the form of a socket. The electrical contact between the first and the second connection sections may for example be established by means of a multilam (e.g. a circumferential band of contact leaves). The multilam may for example be seated in the respective socket.

In an embodiment, the electrical conductor is the conductor of a subsea cable. The connection member may comprise a cable crimp having one end adapted to be crimped to the conductor of the subsea cable. The other end of the cable crimp may provide the first connection section, for example in form of a socket or of a cylindrical section. In this embodiment, the termination gland may be a cable gland that terminates the end of a subsea cable.

In another embodiment, the electrical conductor is a pin. The connection member may comprise a connection adaptor that has one end adapted to receive and electrically contact the pin (i.e. in particular the electrical conductor provided by the pin). The other end of the connection adaptor may provide the first connection section. In this embodiment, the termination gland may be a module interface gland, in particular a so called CMI (Common Module Interface) gland, that terminates the electrical conductor provided by a pin, such as a pin reaching through a subsea enclosure.

In an embodiment, the termination gland comprises a moulding having a passage extending through the moulding along an axial direction. The first connection section is arranged in the passage. The termination gland has an opening for insertion of a pin of the connector front end. The pin comprises the second connection section. The opening leads into the passage of the moulding so as to allow insertion of the pin of the connector front end through the opening in the gland into the passage. The first and second connection sections may then engage in the passage. By means of such moulding, voids and spaces around the pin of the connector front end may be kept small or may even be prevented. This is particularly beneficial in high voltage applications in which electrical stresses may concentrate in such voids or spaces. Furthermore, by means of such moulding, an inner space or chamber inside a gland housing of the termination gland may be sealed from the ambient environment.

The moulding is a flexible or resilient moulding. The moulding may be made of an elastomeric material. The moulding may comprise a flexible or resilient dielectric insulator. The passage in the moulding may be sized such that when the pin is inserted into the passage, the moulding is in contact and fits tightly around the outer circumferential surface of the pin. Accordingly, voids or the trapping of air between the moulding and the pin may be prevented. The opening in the termination gland may be termed first opening, and the pin of the connector front end is herein termed first pin.

The termination gland may have a second opening opposite the first opening. The second opening may be configured to receive an end of a subsea cable. The second opening may lead to the passage of the molding, wherein at least a conductor, advantageously at least a conductor and an insulator of the subsea cable extend into the passage. In the passage, the conductor may be connected to the connection member, for example to the above mentioned cable crimp. The electrical connection can thus be established in a space that is sealed from an inner chamber of the termination gland and the number of voids or spaces inside the moulding can be kept low.

In another embodiment, the termination gland may have a second opening for insertion of a second pin, which provides the electrical conductor that is terminated in the termination gland. The second opening may be opposite to the first opening and may lead into the passage of the moulding from an opposite side. The connection member may comprise an adapter that is arranged inside the passage of the moulding. The adapter provides at one end the first connection section for connection to the first pin and provides at the second end an engagement portion for engagement with the second pin. The connection to the first pin and the connection to the second pin may both comprise a multilam.

In an embodiment, the moulding is a multilayer moulding providing electrical screening for the first and second connection sections when the front end is mated to the termination gland. The moulding may for example comprise a first conductive layer that is in electrical contact with the connection member, a second conductive layer that provides an earth screen and an insulating layer disposed between the first conductive layer and the second conductive layer. Such layer providing the earth screen may for example be in electrical contact with a housing of the termination gland and with a respective conductive layer of a subsea cable, or with a pin housing of a respective second pin. By providing such multilayer moulding, electrical stresses can efficiently be confined to an area between the first and second conductive layers of the moulding, i.e. to inside the insulating layer of the moulding. Further, thus control of the electrical stress may allow the separation of the electrical stress control function from the pressure compensation that may be provided by the medium filling the chamber in the gland housing. The different components, i.e. moulding for electrical stress control and medium for pressure compensation, may thus be optimized for their respective task. Conventionally, dielectric oil or gel filling a connector had to perform both functions (pressure compensation and electrical insulation), and could thus not be fully optimized to perform either one of these two functions.

The first conductive layer advantageously extends at least over the region in which the connection member is disposed in the passage. The area in which the dry mating (in particular the establishing of the electrical contact) between the termination gland and connector front end occurs may thus be kept relatively free of electrical stresses.

The layers of the moulding may be arranged such that when the connector front end is mated with the termination gland, there is an interference fit between at least the insulating layer of the moulding and an insulating sleeve of the first pin so that voids or spaces can be avoided that degrade the insulation, and so that crimp points along the insulating sleeve of the pin can be avoided.

In an embodiment, the moulding as a resilient moulding and the passage of the moulding has an inner diameter that is at least over part of its length (slightly) smaller than an outer diameter of the pin of the connector front end so that when the connector front end is mated with the termination gland, an interference fit is obtained between at least part of the passage and the pin of the connector front end. As an example, the inner diameter may be 5-10% smaller than the outer diameter of the pin.

In an embodiment, the passage of the moulding is tapered towards the first connection section such that the interference fit exhibits a pressure gradient with a lower pressure towards the end of the moulding at which the pin of the connector front end enters the passage of the moulding. The inner diameter of the passage may for example be reduced from a position at the entrance of the passage at which the first pin of the connector front end enters the passage towards a position where the first connection section is located. By means of such pressure gradient, air or other fluids that may be trapped between the moulding and the pin may be expelled towards the end of the moulding at which the pressure is lowest, and may thus almost completely be expelled from the passage. Air or other fluids may thus efficiently be transported out of the passage, and the occurrence of voids or trapped air between the first pin and the moulding may be prevented.

In an embodiment, the moulding has a sealing skirt at a front end of the moulding at which the pin enters the passage of the moulding. The sealing skirt is sealed towards a gland housing of the termination gland. By means of the moulding and such sealing skirt, an inner chamber of the termination gland may be effectively sealed from the ambient environment. The termination gland may thus be filled with a medium at its manufacturing site, without the need for a further fill (e.g. of the space between the termination gland and the connector front end) at an assembly site where the gland is mounted to a subsea device or attached to a front end.

In an embodiment, the termination gland has a gland housing providing the sealing section. The sealing section may comprise a first sealing section for establishing a first seal with the connector front end and a second sealing section for establishing a second seal with the connector front end. The termination gland may be configured to have a first mating position in which the first seal is engaged and a second mating position in which the first seal and the second seal are engaged. The termination gland housing may be configured to provide a passage for an evacuation of the space between the termination gland and the connector front end in the first mating position. By such configuration, the sealed space that is sealed by the first seal may be evacuated efficiently, so that trapped air may be removed out of the passage provided by the moulding and out of the space between the termination gland and the connector front end during dry mating. In the second mating position, the termination gland and the connector front end may be fully mated. They may for example be bolted together in the second mating position. By means of the first seal and the second seal, a two-barrier sealing of the space between the two parts can be achieved. The passage for evacuation may for example be provided by an evacuation port, and the evacuation port may be sealed by a sealing bung after evacuation.

The evacuation port may be provided in the connector front end or in the termination gland. The port may be arranged such that in the first mated position, the evacuation port is in flow communication with a sealed space formed between the connector front end and the termination gland to allow evacuation of the sealed space; and in the second mated position is sealed off from the sealed space by the first seal.

According to a further embodiment, a connector front end for underwater use is provided. The connector front end comprises a front end body, a second connector interface on one side of the front end body wherein the second connector interface is dry-mateable and is configured to be mated with a complementary first connector interface of a subsea termination gland, which can have any of the above outlined configurations. The connector front end furthermore comprises a wet-mateable connector interface on the other side of the front end body. The connector front end is configured to form a wet-mateable connector part when the connector front end is joined to the termination gland. Such wet-mateable connector part may for example be deployed subsea, and may in the subsea environment be mated with a compatible other wet-mateable connector part.

In an embodiment, the second connector interface comprises a pin having an inner conductor and an outer insulating sleeve. A second connection section that is provided in proximity to the tip of the pin may be in electrical contact with the conductor. The wet-mateable connector interface may be a plug part that comprises an opening for the insertion of the pin, or may be a receptacle part comprising a receptacle and a receptacle pin. The pin of the second connector interface and the receptacle pin may for example be provided by a single pin that reaches through the body of the connector front end.

According to a further embodiment, a connector front end for underwater use is provided. The connector front end includes a front end body, a second connector interface on one side of the front end body, wherein the second connector interface is dry-mateable and is configured to be mated with the complementary first connector interface of the subsea termination gland, and a third connector interface on the other opposite side of the front end body. The connector front end is configured to be joined to the termination gland and to provide a connection through the wall of a subsea enclosure or a connection between two termination glands. The second connector interface may have a pin projecting from the front end body, and the third connector interface may have a pin projecting from the front end body. The two pins may for example be provided by a single pin that extends through the front end body and projects from both sides thereof.

Such connector front end may have a through-going electrical conductor and a through-going insulating sleeve that passes through the front end body. The sleeve may have a wider diameter portion in an area which is located inside the front end body to retain the pin in the front end body. The front end body may comprise or may consist of a flange with a through hole in which the pin is arranged and sealed. Accordingly, the connector front end may have a relatively simple configuration. It may thus be manufactured relatively fast and cost efficient and may for example be provided for mounting and sealing a subsea enclosure. A cable may then fast and efficiently be terminated to such subsea enclosure by making use of the above described termination gland.

Such a connector front end may for example be configured as a penetrator that penetrates a wall of the subsea enclosure and that is capable of withstanding the differential pressure applied across the subsea enclosure when deployed subsea.

According to a further embodiment, a connector assembly for underwater use is provided. The connector assembly includes a termination gland that has any of the above outlined configurations and that provides a first connector interface, and a connector front end that provides a second connector interface. The first connector interface of the connector assembly is dry-mated with the second connector interface to join and seal the termination gland to the connector front end. A connector assembly that can be assembled onsite and in a fast and efficient way may thus be obtained.

In an embodiment, the space between the first connector interface and the second connector interface may be evacuated during the mating of the first connector interface with the second connector interface, i.e. during the mating of the connector front end with the termination gland.

According to a further embodiment, a method of assembling a connector assembly for underwater use is provided. The method comprises the step of providing a termination gland, providing a connector front end, dry-mating the termination gland and the connector front end into a first mated state, in which the termination gland is sealed to the connector front end and a sealed space is formed there between, evacuating the sealed space, and sealing of the evacuation port from the sealed space. Sealing off of the evacuation port may for example be achieved by bringing the termination gland and the connector front end into a second mated state in which the evacuation port is located behind the seal established between the termination gland and the connector front end.

In an embodiment, the method is performed so as to obtain a connector assembly in any of the above outlined configurations.

According to further embodiment of the invention, a moulding for a subsea connector part is provided. The moulding may have any of the above described configurations. The moulding may for example include an inner conductive layer, an intermediate insulating layer and an outer conductive layer and may provide a passage for the pin. It may further more be configured to provide a pressure gradient of a pressure applied by an interference fit of such pin in the passage of the moulding, wherein the pressure increases from the entrance of the passage where the pin enters the molting towards the center of the moulding. The pressure may further increase all the way through the passage towards the other end of the moulding.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

The forgoing and other features and advantages of the invention will become further apparent from the following detailed description read in conjunction with the accompanying drawings. In the drawings, like reference numerals refer to like elements.

FIG. 4 is a schematic drawing showing an enlarged view of a section of FIG. 3.

FIG. 5 is a diagram illustrating a pressure increase in a moulding of a termination gland according to an embodiment.

FIG. 6 is a schematic drawing showing a termination gland terminating the end of a cable and a connector front end in form of a wet-mateable plug according to an embodiment.

FIG. 7 is a schematic drawing showing a termination gland terminating the end of a cable and a connector front end in form of a wet-mateable receptacle according to an embodiment.

FIG. 8 is a schematic drawing showing a termination gland and a connector front end in form of a bulkhead plate according to an embodiment.

FIG. 10 is a schematic diagram showing a termination gland terminating an electrical conductor provided by a bulkhead plate and being connected to a connector front end according to an embodiment.

FIGS. 13A to 13C are schematic drawings showing the sealing between a first connector part and a second connector part according to a further embodiment.

FIG. 14 is a flow diagram illustrating a method according to an embodiment.

DETAILED DESCRIPTION OF INVENTION

Figure 1:
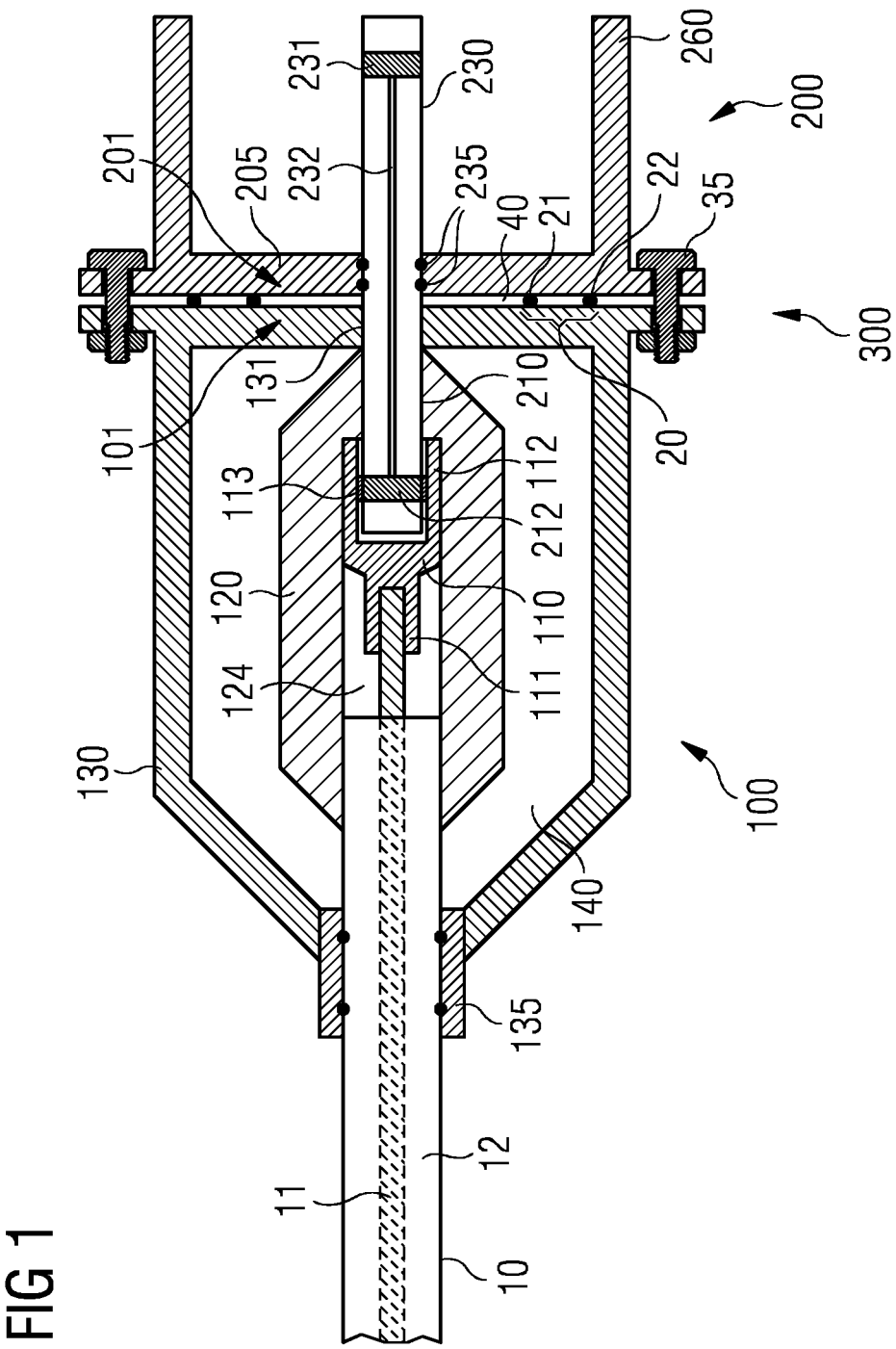
FIG. 1 is a schematic drawing showing a sectional side view of a first connector part in form of a termination gland and a second connector part in form of a connector front end according to an embodiment.

In the following, embodiments illustrated in the accompanying drawings are described in more detail. It should be clear that the following descriptions are only illustrative and non-restrictive. The drawings are only schematic representations, and elements in the drawings are not necessarily to scale with each other. In some embodiments, the elements illustrated in the drawings, for example of FIGS. 2 to 4 and 6 to 10, may be to scale with each other as shown in these drawings.

Conventionally, cable terminations have been crimped onto a cable with a standard crimp and the crimped cable is pushed home against the front end before a gland is built up around the cable to keep out water. Primary electrical insulation is provided by potting in a dielectric medium, usually silicone rubber. It is necessary to wait for the rubber to cure and then to fill the compensating fluid chambers. This may take several days.

By contrast, a dry mateable termination is one that can be terminated with no fluid fills or rubber potting needed at the time of termination, whether the termination is done onshore, or on site at sea, so saving a lot of expensive sea time. A dry mateable termination is also easy to clean, if required.

FIG. 1 illustrates a connector assembly 300 for underwater use. It includes a first connector part 100 in form of a termination gland and a second connector part 200 in form of a connector front end. The termination gland 100 and the connector front end 200 are dry-mateable, i.e. they are to be mated in a gaseous environment above the water surface. In particular, termination gland 100 and connector front end 200 are not wet mateable in a subsea environment.

The termination gland 100 provides a termination and connection to an electrical conductor which in the example of FIG. 1 is the conductive core 11 of the subsea cable 10. The termination assembly provided by termination gland 100 comprises a connection member 110 which in the example of FIG. 1 is provided as a cable crimp. Connection member 110 comprises a crimp section 111 by means of which it is crimped to the conductive core 11 of cable 10. It furthermore comprises a first connection section 112, which in the example of FIG. 1 is provided in form of a socket. The socket may comprise electrical contacting means, such as a multilam 113, which is essentially a ring having a lamellar structure for providing good electrical contact. Other possibilities are the use of a bal spring/canted coil spring or the like.

The termination gland 100 has a first connector interface 101 that is configured for dry mating with the complementary second connector interface 201 of the connector front end 200.

The termination gland 100 comprises a sealing section 20 by means of which it is sealed to the connector front end 200. Sealing occurs via the seals 21 and 22 in the example of FIG. 1. These seals may form part of the termination gland 100 and/or of the connector front end 200. As an example, the termination gland 100 may provide sealing surfaces towards which these seals 21, 22 provide sealing, or it may comprise the seals 21, 22 themselves. By means of the sealing section, a space 40 is sealed from the ambient environment. Note that the sealing section is only illustrated schematically in FIG. 1, and that it is advantageously configured as described with respect to any of the embodiments of FIGS. 2, 3, 9 and 11-13.

Advantageously, the first and second connector interfaces 101, 102 are formed such that the volume of the sealed space 40 is kept relatively small. Advantageously, the front faces of the connector interfaces 101, 201 abut and have a complementary shape so that the sealed space 40 has a volume that approaches zero.

During mating, the sealed volume 40 is advantageously evacuated so that the in the mated condition illustrated in FIG. 1, a vacuum is present in the sealed space 40. This can improve characteristics of the connector assembly 300 when operated at high voltages since negative effects resulting from air filled spaces and voids which can result in discharges or concentration of electrical stresses may be avoided.

Termination gland 100 and connector front end 200 are mounted and secured together by the bolts 35 which are distributed circumferentially about the first and second connector interfaces 101, 201. The termination gland and the front end can be provided with respective flanges which are pressed together by tightening the bolts 35, thereby providing good sealing by means of the sealing section 20.

The termination gland 100 comprises a gland housing 130 having an opening 131 for insertion of a pin 210 of the connector front end 200. In the gland housing 130, a moulding 120 is provided. The moulding is flexible or resilient, such as an elastomer. The moulding may comprise a flexible or resilient dielectric insulator. The conductor 11 of the cable 10 and advantageously also part of the insulation 12 of cable 10 reaches into the moulding 120. Moulding 120 has a through-going passage 124 extending along an axial direction through the moulding. The connection member 110 is arranged inside the through-going passage 124. The electrical conductor to be terminated i.e. the conductive core 11 of cable 10 in FIG. 1, enters the passage 124 from one end of the moulding 120. The other end of the passage 124 of moulding 120 is aligned with the opening 131 in the gland housing 130. The moulding is sealed at this end to the gland housing 130. Furthermore, at the other end, the moulding is sealed to the subsea cable 10. As an example, a sleeve may be moulded or otherwise attached to an outer circumferential surface of the cable insulator 12, and the moulding 120 may be sealed to such sleeve. Termination gland 100 accordingly comprises an opening provided by the opening 131 and the passage in the moulding 120 into which the pin 210 of the connector front end 200 can be inserted. An inner chamber 140 of the termination gland 100 is sealed from the opening. When in the unmated state, the opening is open to the ambient environment, so that for example the first connection section 112 gets into contact with the ambient medium, for example air.

The inner chamber 140 is filled with an medium, in particular insulating medium, and is sealed against the ambient environment. As an example, the termination gland 100 may comprise a cable grip 135 that firmly holds the subsea cable 10 and that may furthermore comprise seals for sealing against the cable, as schematically illustrated in FIG. 1. Since the passage in the moulding 120 is sealed, the medium can thus be confined to within the inner chamber 140. Termination gland 100 can thus be preassembled onto the subsea cable 10 and can be filled with the medium, such as a dielectric liquid or gel, or a pourable polymer material that can be cured, in a factory. It may then be transported to an assembly site where it is assembled onto a subsea structure, without the connector front end 200 being attached. Connector front end 200 can then be dry-mated at the assembly site, for example onboard of a ship or dockside.

The pin 210 of the connector front end 200 has a second connection section 212. During mating, the termination gland 100 may be pushed onto the pin 210. The pin 210 enters the opening 131 and slides into the moulding 220. The inner diameter of the moulding 220 may be slightly smaller than the outer diameter of the pin 210, so that the moulding will stretch onto the pin 210, giving a good electrical insulation profile. The second electrical contact 212 will engage the first electrical contact 112, with the electrical contact being created by the multilam 113. Mating of the termination gland with the connector front end is thus fast and efficient, and no onsite fluid fill of the termination gland is required.

Furthermore, if a different connector front end 200 is to be used, the connector front end 200 can be de-mated fast and efficiently from the termination gland 100 by loosening the bolts 35 and pulling the termination gland 100 off the connector front end.

The medium filling the inner chamber 140 is advantageously a dielectric liquid or gel, it may also be an elastomeric material, for example a polymer that is cured inside the inner chamber 140. The termination gland 100 furthermore comprises a pressure compensator (not shown) that balances the pressure inside the inner chamber 140 to the pressure prevailing in the surrounding environment. The pressure compensator may be provided by means of bellows, a bladder, a membrane or the like that is capable of changing its volume to accommodate volume changes of the medium filling the inner chamber 140. Two such pressure compensators, for example a bellows and a membrane, can be arranged in series so as to provide a double barrier against seawater ingress. When the termination gland 100 is deployed subsea, the seawater acts on the outer compensator, which transfers the pressure via the inner compensator to the medium filling the inner chamber 140. The pressure inside the termination gland is thus balanced to the environmental pressure so that large pressure difference across the termination gland housing 130 can be prevented.

On the other side of the second connector interface 201, the connector front end 200 comprises in the example of FIG. 1 a receptacle part 260 of a subsea wet-mateable connector. The receptacle part 260 comprises a receptacle pin 230 that includes an electrical contact section 231. A conductor 232 inside the pin connects the electrical contact 231 with the second connection section 212. As illustrated in FIG. 1, the pins 210 and 230 can be provided by a single pin that extends through a body 205 of the connector front end 200. A relatively simple structure of the connector front end 200 may thus be achieved. Seals 235 seal the pin in the body 205. As can be seen, the body 205 can have a relatively simple structure without inner volumes that require pressure compensation.

The connector front end 200 can be configured differently as described further below, it may for example comprise a plug part of a wet-mateable connector or may simply comprise a bulkhead plate with a through-going pin.

Figure 2:
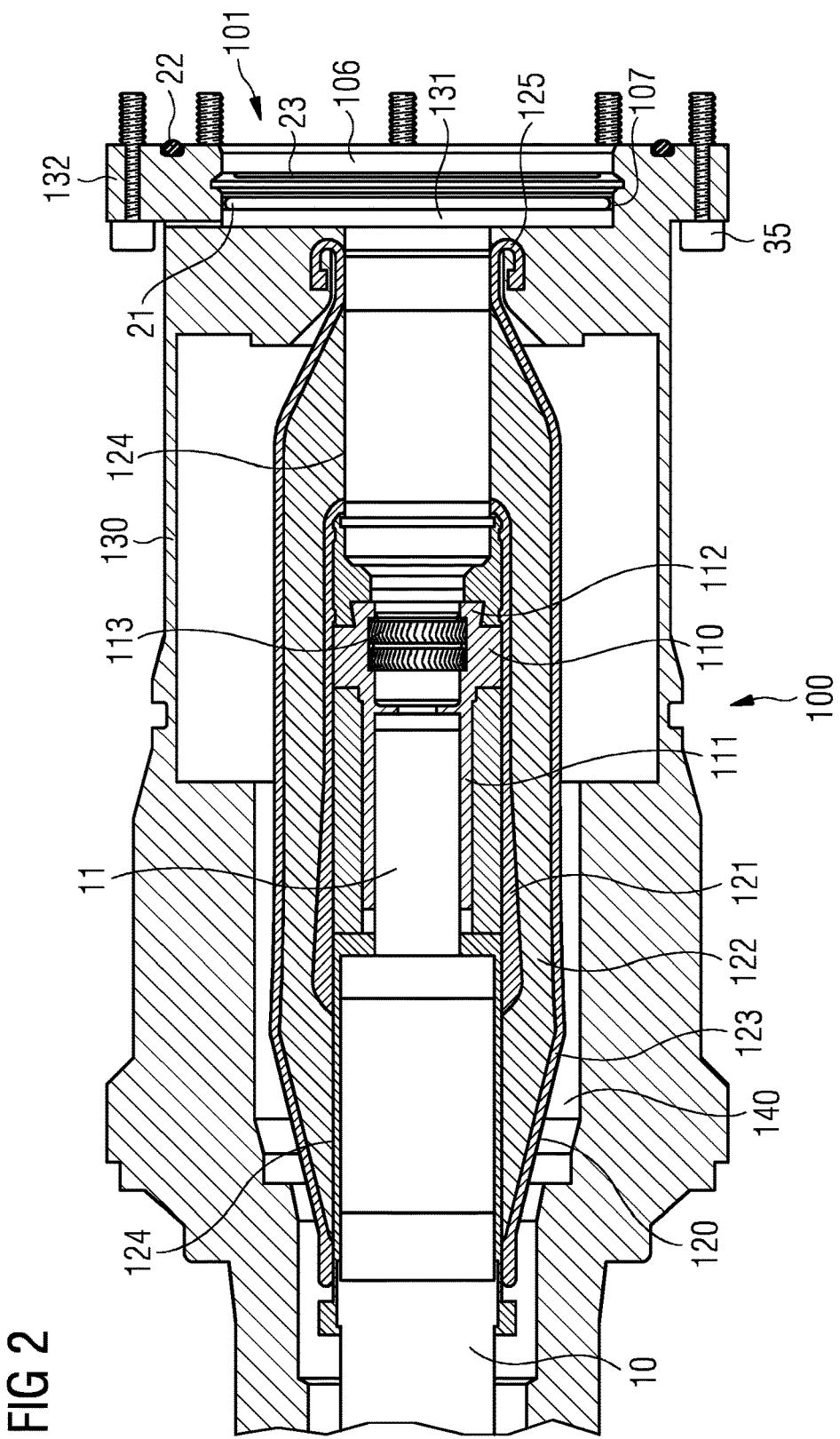
FIG. 2 is a schematic drawing showing a sectional side view of a termination gland according to an embodiment.

FIG. 2 is a schematic drawing illustrating a specific implementation of the termination gland 100 of FIG. 1, so the above explanations equally apply to the embodiment of FIG. 2. As can be seen, the cable 10 extends into a passage 124 provided through the moulding 120. On the other end of the moulding, the opening 131 leads into the passage 124. As can be seen, at the end of the moulding 120 located in the front portion of the termination gland 100 (i.e. the portion where the pin 210 enters the termination gland 100) a sealing skirt 125 is provided and is clamped in the gland housing 130 so that the passage 124 is sealed from the inner chamber 140 of the termination gland 100. The sealing skirt 125 comprises a cylindrical portion of reduced thickness of the moulding and a circumferential lip. It is bent around (folded back) and clamped between two parts of the gland housing 130.

The front portion of the gland housing 130 is provided with a cylindrical recess 106 having an inner cylindrical face 107. The inner cylindrical surface 107 comprises sealing portions for sealing against the first seal 21 and an auxiliary seal 23, which are schematically illustrated in FIG. 2. The gland housing 130 furthermore comprises a flange 132 at which a further sealing portion for sealing against a seal 22 is provided. In some embodiments, one or more of the seals 21, 22 and 23 can form part of the termination gland 100, they may be seated within respective recesses. In other embodiments, the for example the seals 21 and 23 may be provided on the connector front end 200. The sealing section 20 of termination gland 100 includes the respective sealing portions, and the seals 21, 22 and 23 can be configured as described with respect to FIGS. 11 to 13. In another embodiment, the sealing section is configured as described with respect to FIGS. 13A to 13C.

Bolts 35 are used to mount the flange 132 to a corresponding flange of the connector front end 200.

As can be seen in FIG. 2, the moulding 120 is a multilayer moulding. In an exemplary configuration, it includes an inner conductive layer (or moulding) 121 that is in electrical contact with the connection member 110 and thus also with the conductive core 11 of the cable 10 and, when mated, with the second connection section provided on the pin 210. The elements within the inner conductive layer 121 are thus at substantially the same electrical potential during operation, so that electrical stresses within the inner conductive layer 121 can be prevented. The moulding 120 further includes an outer conductive layer 123 that is an earth screen layer and that can be in electrical contact with an earth screen of the cable 10. The outer conductive layer advantageously extends over the entire length of the moulding 120. The outer conductive layer 123 can furthermore be in electrical contact with the gland housing 130 and thus also with a respective body of the connector front end 200. An effective earth screen is thus provided around the electrical conductors extending through the termination gland 100. The moulding 120 further includes the insulating layer 122 between the inner and outer conductive layers 121, 123. In such arrangement, electrical stresses are effectively confined to within the insulating layer 122. In particular, a medium filling the inner chamber 140 is not exposed to such high electrical stresses, so that degradation of such medium may be prevented.

FIG. 2 further illustrates in more detail a possible configuration of the connection member 110. In particular, the multilam 113 is shown in more detail. The crimp section 111 of the connection member 110 is crimped onto the conductive core 11 of the cable 10.

Figure 3:
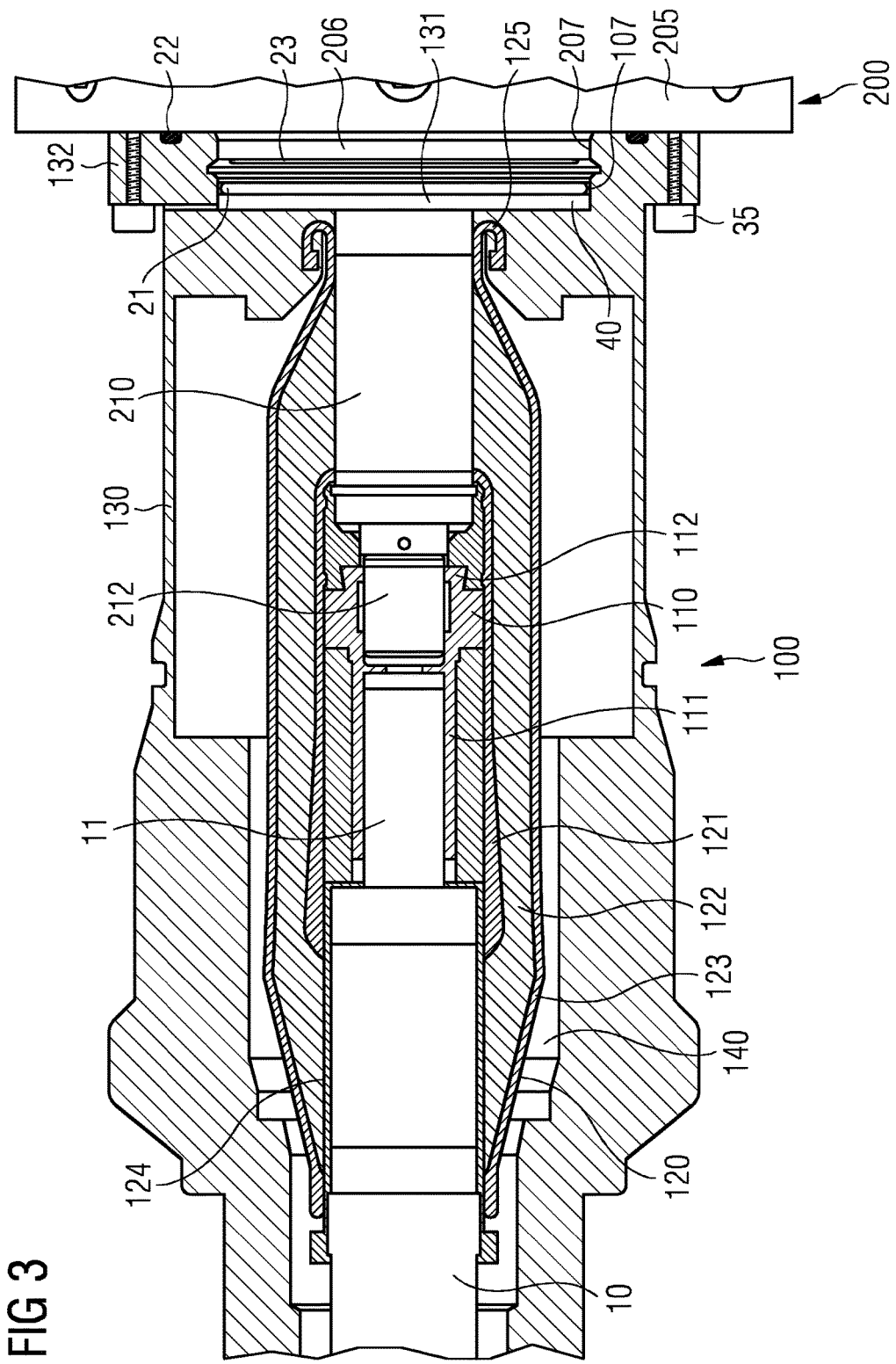
FIG. 3 is a schematic drawing showing a sectional side view of a termination gland according to an embodiment that is mated with a connector front end.

FIG. 3 is a schematic drawing showing the termination gland 100 of FIG. 2 in a mated state in which a connector front and 200 is mated to the termination gland 100. As can be seen, the pin 210 has entered the opening 131 and has passed through the passage 124. The second connection section 212 which is provided in form of a conductive pin tip has engaged the first connection section 112 of the connection member 110. A good electrical contact is established by means of the multilam 113.

The body 205 of the connector front end 200 includes a cylindrical section 206 that is complementary to the cylindrical recess 106 and that has entered the cylindrical recess 106 in the mated state. As illustrated, the cylindrical section 206 may comprise grooves or recesses that receive the seals 21 and 23. Flange 132 is bolted by means of bolts 35 to the body 205 of connector front end 200. By having such complementary shapes of the first and second connector interfaces 101, 201, the sealed space 40 between the first and second connector interfaces can be kept relatively small. During mating and prior to full engagement of the seals, the space 40 is evacuated as explained further below in more detail.

FIG. 4 shows in more detail the moulding 120 of the termination gland 100. In the passage 124, further elements or sleeves 125 may be disposed. These may have insulating or conductive properties, depending on the application, and can furthermore act as anti-extrusion rings to prevent extrusion of the moulding 120 into spaces or voids within the passage 124.

When the connector front end 200 is dry mated with the termination gland 100, and the pin 210 enters the passage 124 in the moulding, the flexible, or resilient moulding 120 stretches onto the pin 210, and air may become trapped within the passage 124 of the moulding 120. Trapped air is not desirable, as it may cause problems with pressure differentials at deployment depth at which substantial external pressures prevail. Furthermore, air that is trapped between the mating surface of the moulding 120 and the pin 210, for example in the region indicated with reference numeral 127, may cause problems in the insulation system and may cause the insulation to degrade or fail.

When the pin 210 moves further into the passage in the moulding 120, the pressure of the trapped air is increased. The passage 124 of the moulding 120 is at least at its front portion tapered, wherein the inner diameter is larger at the front portion (i.e. in proximity to the sealing skirt 125 where the pin 210 enters the passage), and the diameter is reduced towards the middle of the moulding. By means of such shape, the pressure at the interface between the moulding 120 and the pin 210 is lowest at the front end of the moulding 110, in particular at the position indicated with reference numeral 126, and increases towards the middle of the moulding 120, for example towards the position 128. The pressure may for example be highest at the position 129. When the air is compressed by insertion of the pin 210, the air reaches a pressure that is high enough to stretch the flexible, or resilient, moulding 120, in particular to lift the moulding off the pin's outer surface. The air will then follow the pressure gradient and exit the moulding through the front end of the moulding 120.

In particular, the pressure gradient pushes such trapped air down the interface between the moulding 120 and the respective sleeves 125 or pin 210 until it is released through the forward end of the passage 124 in proximity to the sealing skirt 125. During insertion of the pin 210, air is thus repeatedly released from within passage 125 by a lifting off of the moulding 120 and a release of the air out of the moulding's front end.

Furthermore, and as mentioned above, the sealed space 40 between the termination gland 100 and the connector front end 200 is evacuated during the mating process, so that any air is removed from between the two connector parts, as described in more detail further below. After mating, there is accordingly almost no air trapped between the termination gland and the connector front end.

FIG. 5 is a diagram illustrating the pressure gradient of the interface pressure between the inner surface of passage 124 of moulding 120 and the respective component inside the passage, for example the outer surface of pin 210. FIG. 5 shows the pressure gradient between positions 128 and 126 as illustrated in FIG. 4. The pressure may further increase towards the position 129. It should be clear that the pressure gradient does not need to be linear, as illustrated in FIG. 5, but may be tailored to the particular application, for example by adjusting the inner diameter of the moulding 120. The arrow indicates the pressure gradient and the direction in which air will be expelled from between the interfaces.

FIGS. 6 to 8 illustrate different configurations of a connector assembly that employs a termination gland 100 and a connector front end 200 in any of the configurations disclosed herein. In the side views of FIGS. 6 to 8, the interior components of the termination gland 100 and the connector front end 200 are not visible. In the embodiment of FIG. 6, the termination gland 100 is mounted to and terminates the end of a subsea cable 10. The connector front end 200 is provided in form of a plug part of a subsea wet-mateable connector. The second connector interface 201 of the connector front end 200 is mated with the first connector interface 101 of the termination gland 100. As described herein, the pin 210 enters the opening 131 and the passage 124 of the moulding 120 and makes electrical contact by means of the connection member 110. The termination gland 100 and the connector front end 200 are bolted together by means of bolts 35. The termination gland 100 and the connector front end 200 are dry-mated in air, and the sealed space 40 is evacuated during the mated procedure.

In the example of FIG. 7, the connector front end 200 is provided in form of a receptacle part 260 of a wet-mateable connector. The second connector interface 201 of the receptacle part 260 is substantially the same as the second connector interface 201 of the plug part 250. Accordingly, the termination gland 100 can selectively be provided with either a plug part 250 or a receptacle part 260. Due to the dry mating procedure, no onsite liquid filling of the termination gland 100 is required when attaching the connector front end.

A fast and efficient onsite termination of the cable 10 with either a plug part 250 or a receptacle part 260 thus becomes possible. Once assembled, a respective connector assembly for underwater use is formed. The plug part 250 and receptacle part 260 are wet-mateable, they can be mated in a subsea environment at large depths of water, for example in excess of 1,000 or even in access of 3,000 m water depth. Receptacle part 260 can for example comprise a receptacle pin 230, as illustrated in FIG. 1, that engages an opening in a plug body of plug part 250 that is sealed by means of a shuttle pin, in a known manner.

In the embodiment of FIG. 8, the connector front end 200 is provided in form of a bulkhead plate 270 that has a pin 210 projecting on one side thereof and a pin 230 projecting on the other side thereof. Pins 210 and 230 can be provided by a single through-going pin that has an inner conductive core and an outer insulating sleeve. This essentially corresponds to a penetrator that extends through and is sealed in an opening in the bulkhead plate 270. The bulkhead plate 270 is mounted to an opening in the enclosure 400 and seals the opening. The chamber 410 in the subsea enclosure 400 may either be pressure balanced (i.e. the ambient pressure may be transmitted into the chamber 210 by means of a pressure compensator), or it may be kept at a predetermined pressure, for example below 10 bar. The bulkhead plate 270 with its through going pin is capable of withstanding relatively large pressure differentials when the subsea enclosure 400 is deployed at large water depths (for example about 3,000 m water depth where an ambient pressure of about 300 bar prevails). The bulkhead plate 270 may for example be mounted to an opening in the enclosure of a subsea transformer, a subsea switchgear, a variable speed drive or the like. The chamber 410 may be filled with a dielectric fluid, such as transformer oil, Midal or the like and can be sealed by mounting the bulkhead plate 270. The sealed subsea enclosure 400 can then be shipped to an assembly site or loaded onboard a ship for deployment. The termination gland 100 can then be connected to the connector front end 200 in form of bulkhead plate 270 onsite, without requiring any fluid filling. In particular, and as described further above, the termination gland 100 and the bulkhead plate 270 are dry mated and are bolded together, whereby a fast and reliable termination and attachment of the subsea cable 10 to the bulkhead plate 270 can be achieved.

Electric components inside the chamber 410 are connected to the electrical contact 231 of pin 230. It should be clear that other means of providing an electrical connection inside the chamber 410 may be employed, and pin 230 is only one example.

Figure 9:
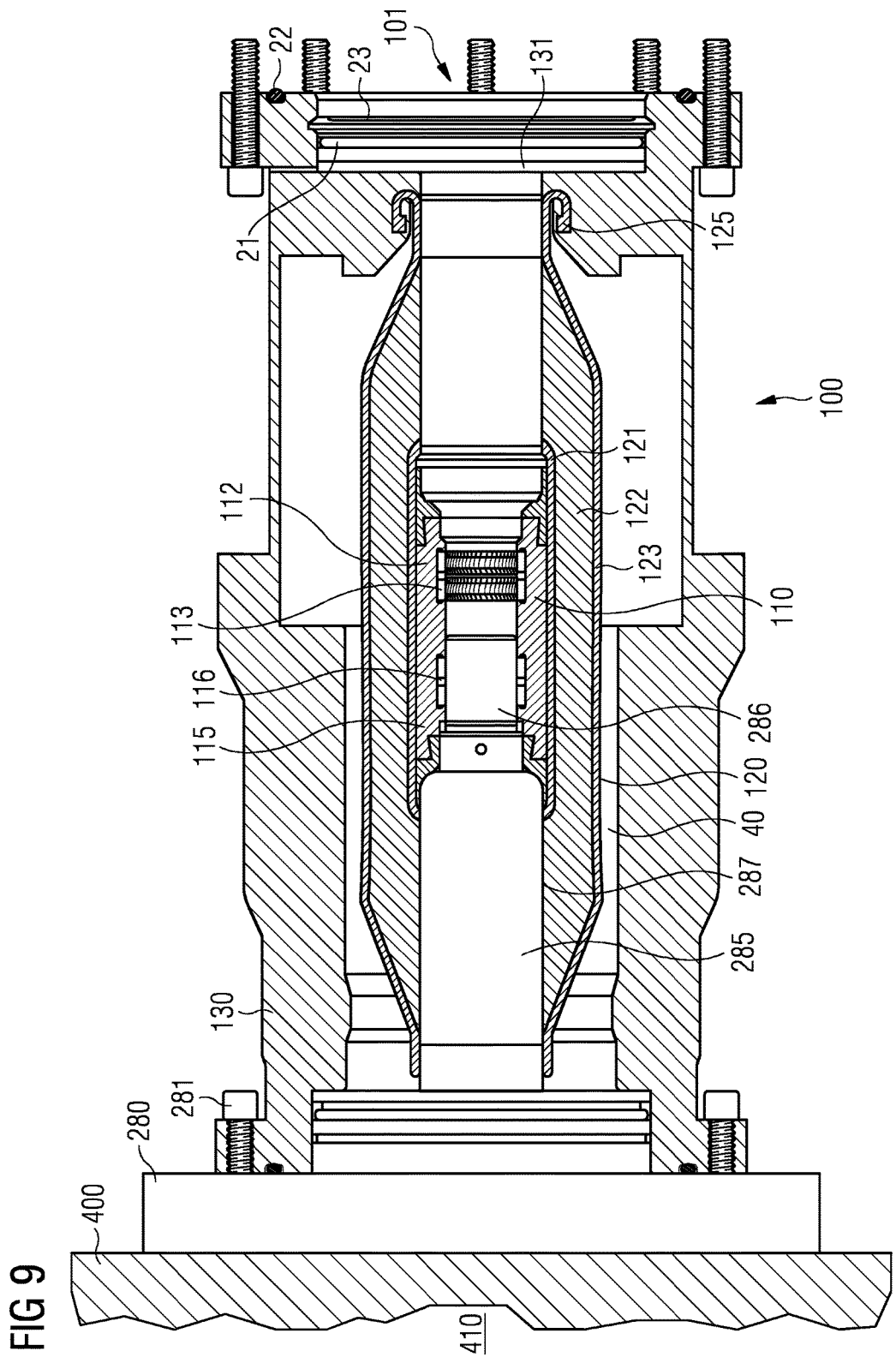
FIG. 9 is a schematic drawing showing a sectional side view of a termination gland according to a further embodiment.

The embodiment illustrated in FIG. 9 is a minor modification of the embodiment illustrated in FIGS. 2 to 5, so that the above explanations equally apply. In the embodiment of FIG. 9, the electrical conductor for which the termination gland 100 provides a termination and connection is a conductive core 11 of a subsea cable 10, but is a pin 285 having an electrical conductor 286 and an insulating sleeve 287. As illustrated in FIG. 10, such pin 285 may be provided by a respective bulkhead plate 280 that can be configured similarly to the bulkhead plate 270. The gland housing 130 may accordingly be provided with a cylindrical recess at its rearward end, into which a cylindrical protrusion of the bulkhead plate 270 reaches and is sealed. At the rear end of the moulding 120, the pin 285 enters the passage 124. The connection member 110 disposed inside the passage 124 of the moulding 120 is provided in form of an connection adapter that has on one side the first connection section 112 and at the other side a third connection section 115. In the example of FIG. 1, the third connection section 115 is configured as a socket contact comprising a multilam 116 that receives and electrically contacts the conductive tip 286 of pin 285. The front end of the moulding 120 is configured as described with respect to FIG. 4, so that a pin 210 can be inserted into the forward end of the moulding 120 so as to achieve the desired removal of air from within the passage 124.

In the configuration illustrated in FIGS. 9 and 10, the connection between the termination gland 100 and the bulk head plate 280 is not a dry-mateable connection. Rather, the termination includes a liquid filling. The cable gland 100 is sealed to the bulkhead plate 280, and the inner chamber 140 is filled with the respective dielectric medium. The termination gland 100 is thus preassembled onto the pin 285, similar to the above described embodiments in which the termination gland 100 is preassembled onto the subsea cable 10. Bolts 281 are used to firmly attach the termination gland 100 to the bulkhead plate 280.

In the configurations described with respect to FIGS. 2 to 8, the termination gland 100 may also be termed cable gland, since it terminates the end of a subsea cable. In the configurations illustrated in FIGS. 9 and 10, the termination gland 100 may be termed CMI (common module interface) gland since it is capable of providing a termination for any type of module having a pin 285.

In the embodiment of FIG. 10, the connector assembly 300 comprises the termination gland 100 having a configuration as illustrated in FIG. 9 and furthermore comprises a connector front end 200 in form of a plug part 250, similar to FIG. 6. Termination gland 100 can be preassembled onto the bulkhead plate 280. The termination gland 100 then provides the first connector interface 101 that is again dry-mateable with a selectable connector front end 200. The desired connector front end 200 can be dry-mated onsite fast and efficiently in dependence on the particular application.

In other embodiments, also the rear part of the termination gland 100 may be provided with a dry-mateable connector interface that is configured similar to the first connector interface 101. Termination gland 100 may then be used as an adapter piece between two pins 210, e.g. between two connector front ends.

Figure 11A:
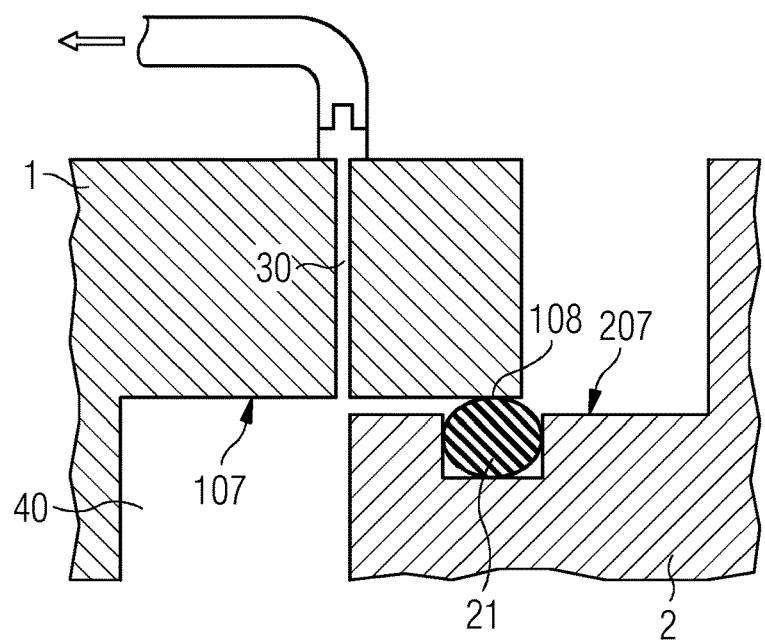
FIGS. 11A and 11B are schematic drawings showing the sealing between a first connector part and a second connector part according to an embodiment.

FIG. 11 shows an embodiment illustrating how the sealing between the termination gland 100 and the connector front end 200 can be implemented. The sealing method and configuration may not only be used with the termination gland 100 and the connector front end 200, but may be used with any first connector part 1 and a second connector part 2 that are dry-mated. FIG. 11A illustrates a first mated state in which a seal 21 is engaged between the first connector part 1 and the second connector part 2. The seal 21 seals the inner sealed space 40 between the two connector parts 1, 2 from an ambient environment. An evacuation port 30 is provided through which the sealed inner space 40 can be evacuated; this is schematically illustrated by the hose and the arrow shown in FIG. 11A, to which a vacuum pump can be connected. A vacuum is thus provided in the sealed inner space 40.

Figure 11B:
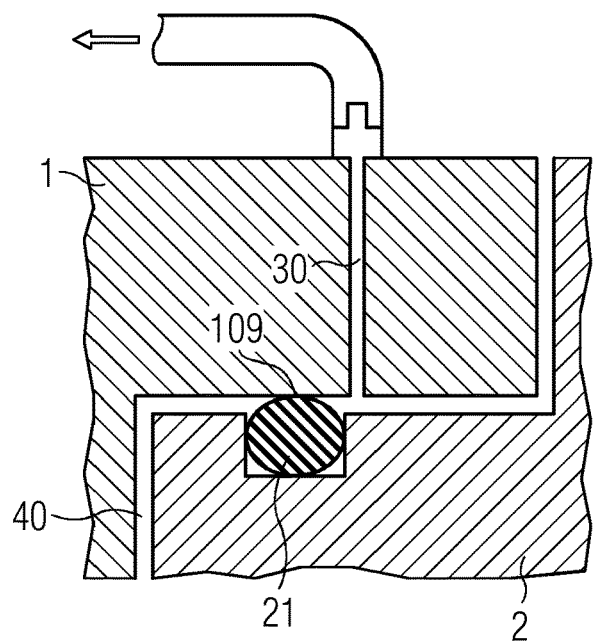

Mating is then progressed and FIG. 11B illustrates a second mated state. Again, seal 21 provides a sealing between the first and a second connector parts 1, 2. Whereas in the first mated state, the evacuation port 30 was in flow communication with the inner space 40, the evacuation port 30 is now sealed off from the inner space 40 in the second mated state shown in FIG. 11B. In particular, in the first mated state of FIG. 11A, the evacuation port 30 is located on a sealed side of the engaged seal 21, whereas in the second mated state, the evacuation port 30 is located on an outer side of the engaged seal 21.

The embodiment of FIG. 11 provides a relatively simple and efficient configuration by means of which the inner space 40 between the first and second connector parts 1, 2 can be evacuated during dry-mating. Only one seal is provided for achieving the evacuation, and the same seal provides the sealing in the first mated state and the second mated state. By separating the passage for evacuation from the space (40) by a single seal (21) in the fully mated position, the chances of a leak into the space (40) occurring are minimised. This may be different in other configurations as described herein after. It should be clear that further seals may be provided and engaged in the second mated state of FIG. 11b, as illustrated for example in FIG. 13C. In the configuration of FIG. 11, the seal 21 is provided in a recess in the outer cylindrical face 207, whereas the evacuation port 30 is provided in the inner cylindrical face 107. It should be clear that this is an example only, and that the seal and the evacuation port may as well be provided at different locations.

Seal 21 may be termed a first seal, and it may in particular constitute a first primary seal since it provides a main sealing of the inner space 40 in the second mated position of FIG. 11B.

In the first mated state of FIG. 11A, the seal 21 is in engagement and in contact with a second sealing region (or sealing portion) 108 provided on the inner cylindrical face 107. In the second mated state of FIG. 11B, the seal 21 is in engagement with a first sealing region (or first sealing portion) 109 provided on the inner cylindrical face 107. The sealing regions 108, 109 are provided on opposite sides of the evacuation port 30.

Figure 12A:
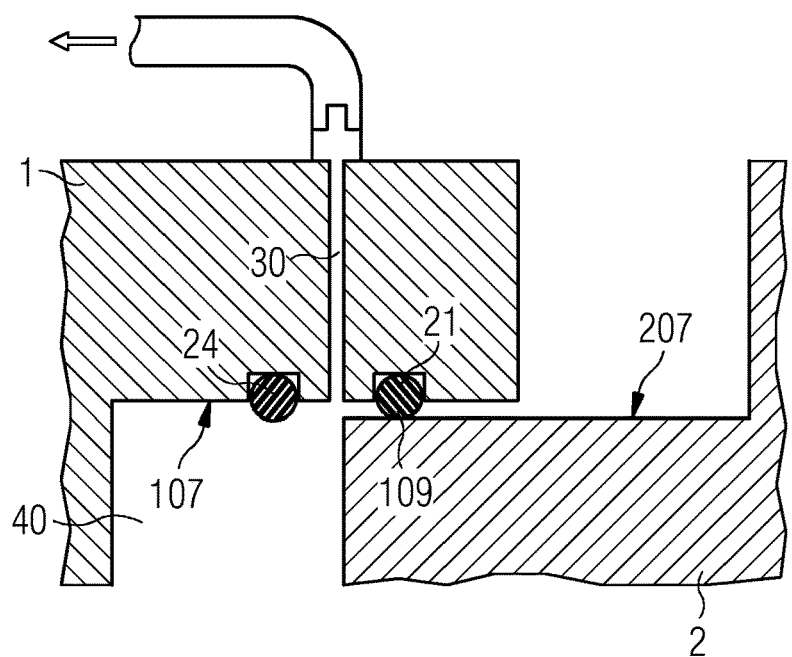
FIGS. 12A and 12B are schematic drawings showing the sealing between a first connector part and a second connector part according to a further embodiment.
Figure 12B:
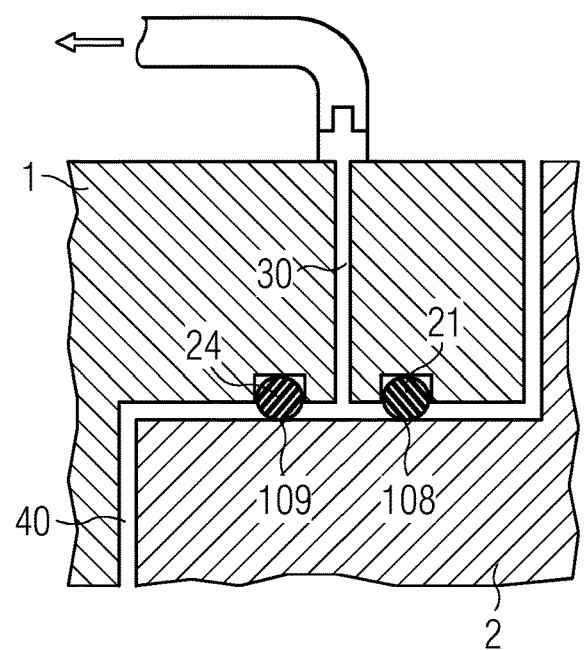

In the configuration of FIG. 12, two seals are provided. In the first mated position of FIG. 12A, the first seal 21 is engaged with a first sealing region 109, and the evacuation port 30 is in flow communication with the inner space 40. When the first and second connector parts 1, 2 are further brought together and reach the second mated state illustrated in FIG. 12B, the further seal 24 is engaged between the first and second connector parts with the first sealing region 109. The evacuation port is now located on an outer side of the engaged further seal 24 and is no longer in flow communication with the sealed inner space 40. In the configuration of FIG. 12, the vacuum pump may for example be operated continuously during the mating procedure, so that a good vacuum is achieved in the inner space 40 upon engagement of seal 24. In the second mated state illustrated in FIG. 12B, the evacuation port 30 may be sealed by means of a sealing bung. Each leak path is then sealed by two engaged seals, thus providing a double barrier against seawater ingress.

In FIG. 12, the seals 21, 24 are provided in recesses in the inner cylindrical face 107 of the first connector part 1, whereas the second connector part 2 comprises respective sealing portions 108, 109 which the seals 21, 24 engage.

Figure 13A:
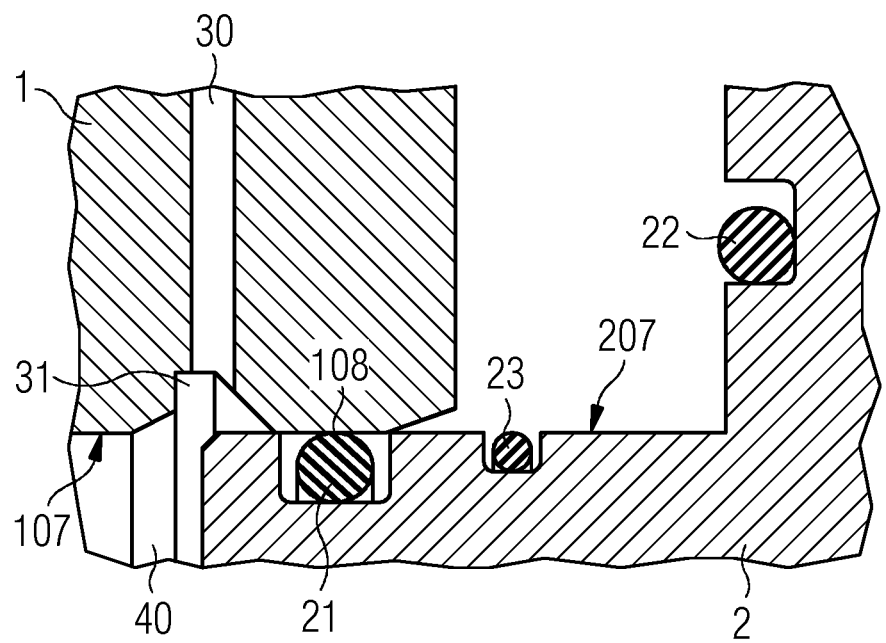
Figure 13B:
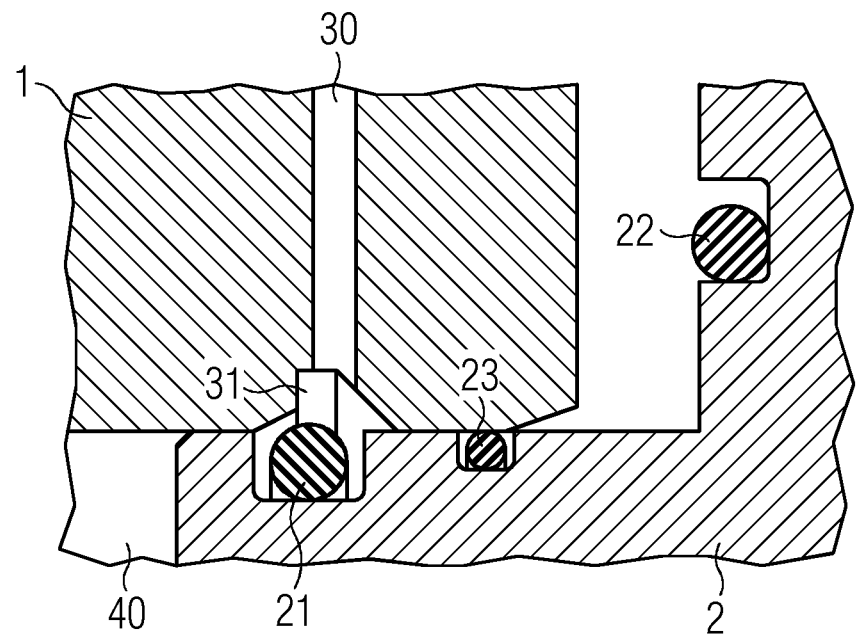

FIG. 13A illustrates a further configuration, wherein the first and second connector parts 1, 2 are in the first mated state. The first seal 21 is engaged (with the second sealing region 108), and the evacuation port 30 is in flow communication with the inner space 40. Upon further engagement of the connector parts, an intermediate state illustrated in FIG. 13B is reached. An auxiliary seal 23 is provided and is engaged in the intermediate state of FIG. 13B. The evacuation port 30 is at its entrance provided with a recess 31. In the intermediate mated state, the recess 31 is located at the position of the first seal 21. Accordingly, the space around the first seal 21 can now be evacuated through the evacuation port 30.

Upon further engagement of the first and second connector parts 1, 2, the first seal 21 is re-engaged (now with the first sealing region 109) and now provides sealing between the first and second connector parts. The evacuation port 30 is now located on an outer side of the engaged first seal 21 and is no longer in flow communication with the inner space 40. By means of the recess 31, the auxiliary seal 23 is bypass. Furthermore, a second seal 22 is provided and is engaged in the second mated position of FIG. 13C. By sealing the evacuation port 30 with a sealing bung, two seals can again be provided for each leakage path. Since the second seal 22 is a main seal that provides sealing for the inner space 40 in the second mated state, it may be termed second primary seal. The two primary seals 21, 22 thus provide a double barrier against seawater ingress. Similarly, the sealing bung sealing the evacuation port 30 and the first primary seal 21 also provide a double barrier against seawater ingress.

In the example of FIG. 13, the seals 21, 22 and 23 are provided in respective recesses within the second connector part 2, which may for example be implemented as the connector front end 200. It should be clear that in other embodiments, the seals may be distributed differently between the two connector parts.

Any of the configurations of FIGS. 11 to 13 may be employed with the termination gland 100 and connector front end 200 described further above. Also, it should be clear that these are only exemplary embodiments and may be modified in accordance with the general teachings of the present application.

FIG. 14 illustrates a flow diagram of a method according to an embodiment. In a first step S1, the first connector part 1 (for example the termination gland 100) and the second connector part 2 (for example the connector front end 200) are brought into a first mated state. A seal is engaged between the first connector part and the second connector part in step S2, for example the seal 21. A sealed inner space 40 is thus formed between the first and second connector parts 1, 2.

In step S3, the sealed inner space 40 is evacuated through the evacuation port 30, which is located on the inner sealed side of the engaged seal in flow communication with the sealed inner space 40. The first and second connector parts 1, 2 are in step S4 brought into a second mated state.

In step S5, a seal is engaged between the first and second connector parts upon bringing these into the second mated state; as an example, the seal 21 or 24 may be engaged. As described above, the engagement of the seal in the second mated state is such that the evacuation port is located on an outer side of the engaged seal so that the evacuation port is no longer in flow communication with the sealed inner space 40.

It should be clear that in other embodiments of the method, the method may comprise further steps, for example steps described with respect to any of FIGS. 11 to 13.

The features of the embodiments described above may be combined with each other unless noted to the contrary.

While specific embodiments are disclosed herein, various changes and modifications can be made without departing from the scope of the invention. The embodiments described herein are to be considered in all respects as illustrative and non-restrictive, and any changes coming within the meaning and equivalency range of the appended claims are intended to be embraced therein.

The invention claimed is:

1. A subsea termination gland for providing a termination and connection to an electrical conductor in an underwater environment, wherein the subsea termination gland comprises:
   a dry mateable first connector interface, configured to be mated with a complementary second connector interface of a connector front end,
   a termination assembly comprising a connection member providing a first connection section of said first connector interface, the connection member comprising one or more pressure resistant components and configured to receive an electrical conductor at a first end, and a flexible, or resilient moulding; wherein the moulding forms a passage which is tapered and in which the connection member is disposed, wherein an inner diameter of the passage is larger at a front portion in proximity to the first connector interface, the front portion configured to allow a pin of the connector front end to enter the passage and then to enter a second end of the connection member, and wherein the inner diameter is reduced towards the middle of the moulding; wherein the first connection section is exposed to the ambient environment when the termination gland is not mated with the connector front end,
   a sealing section at the first connector interface for sealing the termination gland to the connector front end, and
   a gland housing comprising the first connector interface, wherein the moulding is disposed inside the gland housing and forms an inner chamber between the gland housing and the moulding, wherein the gland housing is configured to form a seal with a cable comprising the electrical conductor that passes through the gland housing, wherein the moulding is configured to receive the cable and form a seal therewith, and wherein the moulding is configured to form a seal with the first connector interface, thereby sealing the inner chamber from the passage and from an environment outside the gland housing.

2. The subsea termination gland according to claim 1, wherein the connection member and the first connection section are configured such that the connector front end is de-mateable from the subsea termination gland.

3. The subsea termination gland according to claim 1, wherein the first connector interface comprises an opening for insertion of the pin of a second connector interface, the first connection section being arranged in the opening, wherein when the termination gland is not mated with the connector front end, the opening is open to the ambient environment.

4. The subsea termination gland according to claim 1, wherein the first connection section is a socket configured to receive a second connection section comprising the form of an end of the pin, or wherein the first connection section comprises a cylindrical section configured to be received in the second connection section in form of the socket, wherein an electrical contact between the first and second connection section comprises a multilam for establishing the electrical connection.

5. The subsea termination gland according to claim 1, wherein the electrical conductor is an electrical conductor of a subsea cable, the connection member comprising a cable crimp comprising one end adapted to be crimped to the electrical conductor of the subsea cable and another end providing said first connection section, or wherein the electrical conductor is a pin, the connection member comprising an connection adapter comprising one end adapted to receive and electrically contact said pin, and another end providing said first connection section.

6. The subsea termination gland according to claim 1, wherein the passage of the moulding extends through the moulding along an axial direction, and wherein the termination gland comprises an opening for insertion of the pin of the connector front end, the pin comprising a second connection section, the opening leading into said passage so as to allow the insertion of the pin of the connector front end into said passage and engagement of the first and second connection sections in said passage.

7. The subsea termination gland according to claim 1, wherein the moulding is a multi-layer moulding providing electrical screening for the first and second connection sections when the connector front end is mated to the termination gland, wherein the multi-layer moulding comprises a first conductive layer in electrical contact with the connection member, a second conductive layer providing an earth screen and an insulating layer disposed between the first conductive layer and the second conductive layer.

8. The subsea termination gland according to claim 1, wherein the moulding is a resilient moulding and wherein the passage of the moulding comprises an inner diameter that is at least over part of its length smaller than an outer diameter of the pin of the connector front end so that when the connector front end is mated with the termination gland, an interference fit is obtained between at least part of the passage and the pin of the connector front end.

9. The subsea termination gland according to claim 1, wherein the termination gland comprises the gland housing providing said sealing section, the sealing section comprising a first sealing section for establishing a first seal with the connector front end and a second sealing section for establishing a second seal with the connector front end, wherein the termination gland is configured to have a first mated position in which the first seal is engaged and a second mated position in which the first seal and the second seal are engaged, wherein the gland housing is configured to provide a passage for an evacuation of a space that is sealed between the termination gland and the connector front end by the first seal in the first mated position.

10. A connector front end for underwater use, comprising:
   a front end body;
   a second connector interface on one side of the front end body, wherein the second connector interface is dry-mateable and is configured to be mated with a complementary first connector interface of a subsea termination gland according to claim 1, the connector front end further comprising a wet mateable connector interface on another side of the front end body, wherein the connector front end is configured to form a wet-mateable connector part when the connector front end is joined to the termination gland.

11. The connector front end according to claim 10, wherein the second connector interface comprises the pin comprising an inner conductor, an outer insulating sleeve and a second connection section that is provided in proximity to a tip of the pin in electrical contact with the inner conductor, and wherein the wet mateable connector interface is a plug part comprising an opening for insertion of a pin or is a receptacle part comprising a receptacle and a receptacle pin of a wet-mateable connector.

12. A connector front end for underwater use, comprising:

a front end body;

a second connector interface on one side of the front end body, wherein the second connector interface is dry-mateable and is configured to be mated with a complementary first connector interface of a subsea termination gland according to claim 1, the connector front end further comprising a third connector interface on another side of the front end body, wherein the connector front end is configured to be joined to the termination gland and to provide a connection through a wall of a subsea enclosure or a connection between two termination glands.

13. The connector front end according to claim 12, wherein the second connector interface comprises the pin projecting from the front end body, and wherein the third connector interface comprises a pin projecting from the front end body, wherein the pins are each provided by a single pin that extends through the front end body and projects from both sides thereof.

14. A connector assembly for underwater use, comprising:

a termination gland according to claim 1 comprising a first connector interface, and a connector front end comprising a second connector interface, wherein the first connector interface of the connector assembly is dry-mated with the second connector interface whereby the termination gland is joined and sealed to the connector front end.

15. A method of assembling a connector assembly, comprising:

providing a termination gland according to claim 1, comprising a first connector interface; and providing a connector front end comprising a second connector interface;

dry-mating the termination gland with the connector front end by engaging the first connector interface with the second connector interface and evacuating a space sealed between the termination gland and the connector front end.

16. A subsea termination gland, comprising:

a gland housing comprising a cable opening configured to receive therethrough and form a seal with a cable therethrough at a first gland housing end and a first connector interface at a second gland housing end, the first connector interface comprising a first connector interface opening configured to receive a pin therethrough;

a flexible moulding disposed within the gland housing and defining an inner chamber between the gland housing and the flexible moulding; the flexible moulding comprising a passage therethrough and configured to receive the cable at a first passage end and to receive the pin at a second passage end, wherein the first passage end is configured to seal with the cable and the second passage end is configured to seal with the gland housing, thereby sealing the inner chamber from the passage and from an environment outside the gland housing; and a connection member disposed in the through passage configured to receive an electrical conductor in the cable at a first connection member end and to receive the pin at a second connection member end.

* * * * *